United States Patent [19]

Forbes, Sr.

[11] 3,839,682

[45] Oct. 1, 1974

[54] DIGITAL FM LOGIC CIRCUIT

[75] Inventor: Donald F. Forbes, Sr., Oakton, Va.

[73] Assignee: The United States of America as represented by the Secretary of the Navy, Washington, D.C.

[22] Filed: Apr. 25, 1973

[21] Appl. No.: 354,626

[52] U.S. Cl. .................................. 328/158, 332/48

[51] Int. Cl. .............................................. H03c 1/00

[58] Field of Search ...................... 332/48, 45 A, 44; 328/92 CL, 159, 158

[56] References Cited

UNITED STATES PATENTS

| | | | |
|---|---|---|---|
| 2,705,775 | 4/1955 | Crosby | 332/45 A |
| 2,736,021 | 2/1956 | Sunstein | 328/92 CL |
| 3,076,180 | 1/1963 | Havens et al. | 328/92 CL |
| 3,105,877 | 10/1963 | Miller et al. | 328/158 |

*Primary Examiner*—John S. Heyman
*Attorney, Agent, or Firm*—R. S. Sciascia; Arthur L. Branning

[57] ABSTRACT

A simple frequency latch for use as a logic circuit building block in which two or more signals of predetermined frequency are fed into narrow-band amplifiers and mixers. When all input signals are present, they are mixed together and the mixed signal is fed back to the inputs to shut off further input signals. The mixed signal is stored in the circuit by means of an oscillation loop.

10 Claims, 2 Drawing Figures

DIGITAL FM LOGIC CIRCUIT

BACKGROUND OF THE INVENTION

The invention relates generally to logical switching and latching systems and particularly to a latching system wherein the variable conditions are the frequencies of the input and output signals.

The latching systems used at the present time utilize the amplitude or phase of the output signals. That is, the input and output signals are capable of assuming either a plurality of stable phase conditions or a plurality of stable amplitude conditions. There are many disadvantages inherent in these systems. For example, they are very sensitive to noise and require large numbers of circuit blocks to handle complex functions.

SUMMARY OF THE INVENTION

According to the present invention, a latching system is provided which is capable of generating output signals which assume a plurality of stable frequency conditions in response to input signals of a plurality of frequencies. The output signals are stored for a period of time in a storage circuit.

The circuit is adapted to receive at least two signals of different frequencies. When all the signals are being received, they are mixed together in a non-linear mixer and one of the mixer output frequencies is fed back to the circuit inputs to block the reception of further signals. One of the mixer output frequencies is also fed back to the mixer input causing the mixer to oscillate at that frequency. The oscillation is effectively a storage of the frequency. By circuit design using well known techniques, the length of time the circuit will oscillate can be varied from microseconds to years. A separate input is provided for cutting off the oscillations at any time.

The invention provides a logic element which can be utilized in systems for radar signal processing, inertial and optical guidance, telemetry, computers, or any application presently using logical techniques. The circuit of the invention uses less circuitry to handle more complex functions, and is easier to fabricate, than presently employed amplitude and phase latches.

OBJECTS OF THE INVENTION

An object of the present invention is to provide a frequency latch suitable for use as a logic circuit element.

Another object of the invention is to provide an electronic circuit whose output signal varies in frequency according to the frequency of its input signal.

A further object of the invention is to provide a frequency latch which stores the input frequencies for a predetermined period of time.

Other objects, advantages, and novel features of the invention will become apparent from the following detailed description of the invention when considered in conjunction with the accompanying drawings wherein:

DESCRIPTION OF THE PREFERRED EMBODIMENT

Figure 1:
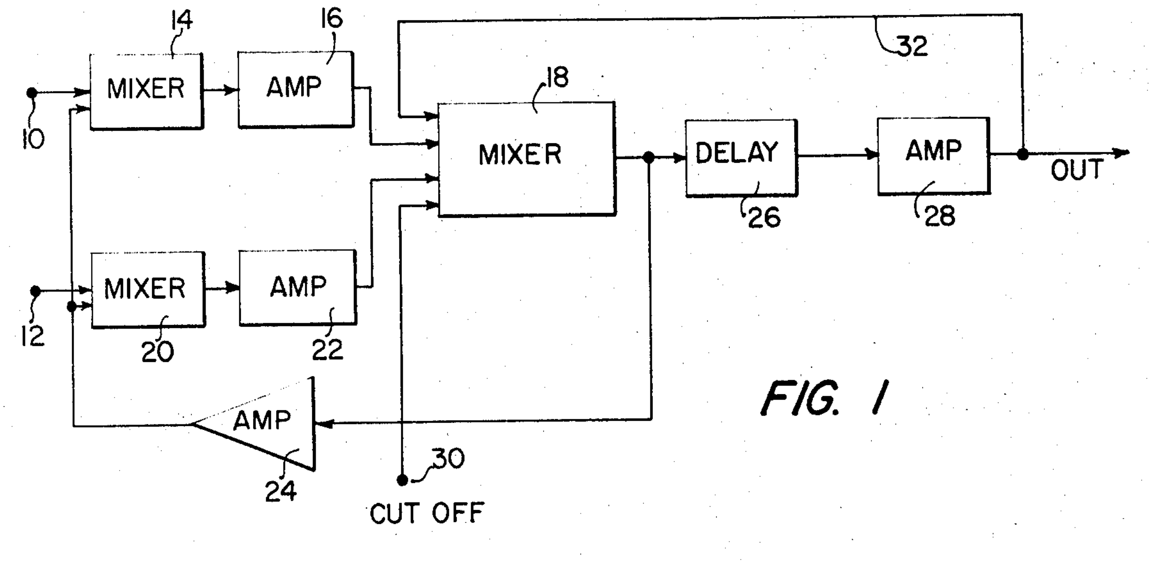
FIG. 1 shows an embodiment of the invention in block diagram form.

Referring to FIG. 1, terminals 10 and 12 receive the signals of predetermined frequencies $f_1$ and $f_2$, respectively. The $f_1$ signal enters a signal channel comprised of mixer 14 and narrow-band amplifier 16 which passes a narrow band of frequencies centered at $f_1$. The output of amplifier 16 is applied to mixer 18. The $f_2$ signal enters the signal channel comprised of mixer 20 and narrow-band amplifier 22 tuned to pass $f_2$. The output of amplifier 22 is applied to mixer 18 where it is mixed with the signal from amplifier 16. Mixer 18 is a non-linear mixer which provides the sum and difference of its input frequencies at its output. The output is fed back to mixers 14 and 20 via amplifier 24 which is also a narrow-band amplifier. The output of mixer 18 is fed back to its input via delay 26 and amplifier 28.

The operation of the circuit of FIG. 1 will now be described. Two signals of different frequencies, $f_1$ and $f_2$, are applied at terminals 10 and 12, respectively, to mixers 14 and 20. The mixers are of the regenerative oscillator type and, in the absence of a signal from amplifier 24, will pass the signals $f_1$ and $f_2$ to narrow-band amplifiers 16 and 22. These are conventional amplifiers which will pass only a narrow band of frequencies centered on $f_1$ (amplifier 16) and $f_2$ (amplifier 22). These signals are now applied to and mixed in non-linear mixer 18 which produces at its output a signal containing both input frequencies as well as the sum and difference frequencies; i.e., $f_1, f_2, f_1+f_2$ and $f_1-f_2$. The output of mixer 18 is applied to the input of narrow-band amplifier 24 which is tuned to pass only the sum frequency $f_1+f_2$. Thus a signal containing $f_1+f_2$ is applied to the inputs of regenerative oscillator mixers 14 and 20 which are driven into full conduction. Since amplifier 16 cannot pass the frequencies which result from mixing $f_1$ with $f_1+f_2$, and amplifier 22 cannot pass the frequencies which result from mixing $f_2$ with $f_1+f_2$, both signals to mixer 18 are cut off. Since it takes approximately one full cycle for the $f_1+f_2$ output of mixer 18 to mix with $f_1$ and $f_2$ in mixers 14 and 20, respectively, the output of mixer 18 passes through delay 26 to amplifier 28 before $f_1$ and $f_2$ are cut off. Amplifier 28 is a narrow-band amplifier tuned to pass a frequency spectrum centered on $f_1+f_2$. Thus, $f_1+f_2$ is fed back to the input of mixer 18 via line 32 and the loop consisting of mixer 18, delay 26 and amplifier 28 oscillates at frequency $f_1+f_2$. Obviously, the delay caused by delay circuit 26 is the amount necessary for the feedback signal to be in proper phase with the input signal to produce oscillations. By oscillating at $f_1+f_2$, the mixer-delay-amplifier loop is essentially storing the $f_1+f_2$ signal which is present on the output line as long as oscillations continue. The oscillations can be cut off at any time by application via terminal 30 of the proper signal to the mixer 18.

The circuit provides a simple but effective frequency latch. In order for the mixer-delay-amplifier loop to oscillate, there must be a signal present at both 10 and 12 and both signals must be of the proper frequency. As soon as both signals are present, the circuit cuts them off and goes into oscillation at the sum frequency. The oscillations can then be cut off and the circuit returned to its original state by the application of a cut-off signal.

Figure 2:
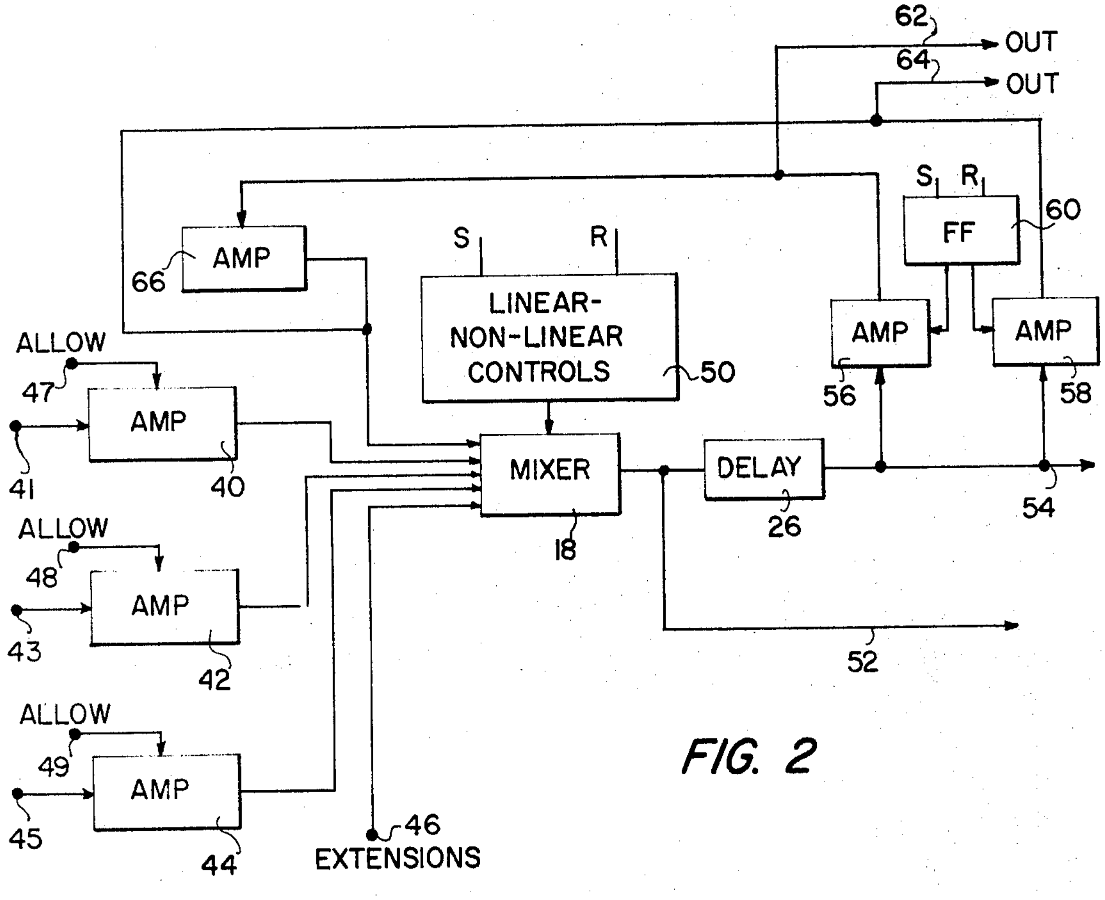
FIG. 2 shows in block diagram form a circuit similar to the embodiment of FIG. 1 but slightly modified to provide more versatility as a logic element.

FIG. 2 is a slight modification of the circuit of FIG. 1 which is more suited to logic element realization as, for example, an integrated circuit or semiconductor chip. The circuit is adapted to be controlled by digital control signals for ease of integration into conventional digital systems. Like reference numerals designate corresponding parts in FIGS. 1 and 2.

The signals are fed into amplifiers 40, 42 and 44 via terminals 41, 43 and 45 respectively. There may be more amplifiers and signal inputs if desired as shown by extension terminal 46, the number which is practical being a design consideration. The conductive state of the amplifiers is controlled by a digital allow signal on terminals 47, 48 and 49. The amplifiers are normally off and become conductive in response to an allow signal. The allow signal is a digital pulse whose width is equal to a few cycles of the input signals. The allow signal is applied at the same time to all the amplifiers which are being used in a particular application. Normally, only two are used at any one time. The amplifiers are narrow-band amplifiers tuned to a predetermined frequency similar to the amplifiers described in regard to FIG. 1. After passing through the amplifiers, the signals are mixed in mixer 18. Depending on the setting of linear, non-linear controls 50, the mixer will provide linear or non-linear mixing. The controls circuit 50 can be any of a number of well known circuits for changing the bias voltage applied to the mixer 18 to vary its operating point between linear and non-linear portions of its characteristic curve. The controls 50 is of a type adapted for digital control. The output of the mixer can be taken directly out of the logic element on line 52. It is also fed to delay circuit 26 whose output can be taken out of the logic element on line 54. The delayed mixer output is applied to narrow-band amplifiers 56 and 58. Only one of these amplifiers is conducting at any particular time due to allow signals from flip-flop 60. Depending on the use to which the logic element is to be put, the amplifiers 56 and 58 can have the same or different pass bands, the same or different amount of phase shift, the same or different amount of amplification, etc. For example, assume frequencies $f_1$ and $f_2$ appear on terminals 41 and 43, respectively, and are passed to the input of mixer 18. If mixer 18 is operating in a linear mode the output of the mixer will be $f_1$ and $f_2$. In order to have an oscillating loop, one of these frequencies must be fed back to the mixer input via amplifier 56 or 58. If mixer 18 is operating in a non-linear mode, the sum and difference frequencies, as well as the input frequencies, will be generated. In order to store one of these frequencies, such as $f_1+f_2$, one of the feedback amplifiers must be capable of passing this frequency. Therefore, one of the amplifiers, such as 56, will have a band pass centered on, for example, $f_2$, while the other amplifier, 58, will pass $f_1+f_2$. The controls 50 and flip-flop 60 would be controlled together so that amplifier 56 conducts when controls 50 place mixer 18 in the linear operating mode and amplifier 58 conducts when mixer 18 is placed in the non-linear mode. It is contemplated that other frequency inputs, such as an $f_3$ input on terminal 45 and an $f_4$ input on terminal 46, while different than $f_2$, will be close enough to $f_2$ and to each other so that the band pass amplifiers, such as 58, will pass the resultant sum frequencies ($f_1+f_3, f_1+f_4$) as well as $f_1+f_2$.

Outputs may be taken after amplification on lines 62 and 64. The output of amplifier 56 is fed to amplifier 66 for phase inversion. The outputs of amplifiers 58 and 66 (only one at any particular time) are fed to the input mixer 18 to cause oscillation and signal storage as described in reference to FIG. 1.

Obviously, many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. An electronic circuit which comprises:
- a mixer having an input and an output;
- means for switchably connecting a plurality of signals to the input of said mixer; and
- means for storing the output of said mixer comprising means for feeding the mixer output back to its input causing said mixer to oscillate.

2. The circuit of claim 1 wherein said feedback means includes a delay circuit and a narrow-band amplifier.

3. The circuit of claim 1 wherein said connecting means comprises a plurality of signal channels, each channel including:
- a mixing circuit adapted to receive one of said signals at its input, and,
- a narrow-band amplifier having its input connected to the output of said mixing circuit and its output connected to the input of said mixer.

4. The circuit of claim 3 wherein each narrow-band amplifier has a different band-pass characteristic whereby each signal channel will pass a different frequency signal.

5. The circuit of claim 4 further including means for feeding a portion of the output of said mixer back to the inputs of all the mixing circuits.

6. The circuit of claim 5 wherein:
- said mixer-to-mixing circuit feedback means includes a narrow-band amplifier having the same band-pass characteristics as the amplifier in said storing feedback means.

7. The circuit of claim 6 wherein said mixing circuits are formed from regenerative oscillator mixers and wherein said narrow-band amplifier in the storing means passes a value of frequency equal to a combination of the frequencies of the plurality of input signals.

8. The circuit of claim 1 wherein said connecting means comprises:
- a plurality of amplifiers, each of which is adapted to receive one of said signals at its input; and
- means for controlling selectively and individually the conductive state of said amplifiers.

9. The circuit of claim 8 further comprising means for controlling the linearity of said mixer.

10. The circuit of claim 9 wherein said mixer feedback means includes:
- first and second narrow-band amplifiers having first and second frequency pass bands, and
- means for causing either said first amplifier or said second amplifier to conduct.

* * * * *